United States Patent
Kane (10) Patent No.: US 12,516,560 B1
(45) Date of Patent: Jan. 6, 2026

(54) WALL PROTECTOR

(71) Applicant: MACNEIL IP LLC, Bolingbrook, IL (US)

(72) Inventor: Stephen Kane, Cedar Lake, IN (US)

(73) Assignee: MACNEIL IP LLC, Bolingbrook, IL (US)

( * ) Notice: Subject to any disclaimer, the term of this patent is extended or adjusted under 35 U.S.C. 154(b) by 14 days.

(21) Appl. No.: 18/763,623

(22) Filed: Jul. 3, 2024

(51) Int. Cl.
*E05F 5/02* (2006.01)
*E05F 5/06* (2006.01)

(52) U.S. Cl.
CPC .................................... *E05F 5/06* (2013.01)

(58) Field of Classification Search
CPC ... E04F 19/026; E04F 11/1804; E04F 19/022; E04F 2013/063; E04F 13/075; A47B 95/043; E05F 5/06; E05F 5/02; E05F 5/022; E05F 5/025
See application file for complete search history.

(56) References Cited

U.S. PATENT DOCUMENTS

| | | | | |
|---|---|---|---|---|
| 3,248,995 A | * | 5/1966 | Meyer | F16B 5/128 24/297 |
| 4,150,517 A | * | 4/1979 | Warner, Sr. | E04F 19/0436 52/718.05 |
| 4,408,372 A | * | 10/1983 | Kimura | F16B 21/073 411/61 |
| 5,467,571 A | * | 11/1995 | Khatibi | E04F 19/0463 403/388 |
| 5,527,139 A | * | 6/1996 | Bruder | F16B 21/08 267/140 |
| 5,752,356 A | * | 5/1998 | Miklavic | E04F 19/0468 52/511 |
| 6,036,155 A | * | 3/2000 | Tsui | B60R 19/02 248/345.1 |
| 6,209,170 B1 | * | 4/2001 | Huynh | E05C 17/52 16/86 A |
| 6,625,950 B1 | * | 9/2003 | Shreiner | E04F 11/1804 52/718.01 |
| 8,572,915 B2 | * | 11/2013 | Meahl | E04F 19/04 52/287.1 |
| 8,863,470 B2 | * | 10/2014 | Bottorff | E04F 19/02 52/718.04 |
| 9,447,840 B2 | * | 9/2016 | Morris | F16B 15/08 |
| 10,995,502 B2 | * | 5/2021 | Field | E04F 19/028 |
| 12,037,210 B2 | * | 7/2024 | Duffy | F16F 1/377 |
| 2004/0227135 A1 | * | 11/2004 | Shreiner | E04F 11/1804 256/65.16 |

(Continued)

FOREIGN PATENT DOCUMENTS

| | | | | |
|---|---|---|---|---|
| DE | 29916563 U1 | * | 4/2000 | E04H 6/426 |
| DE | 202005005423 U1 | * | 8/2005 | E04B 2/72 |
| KR | 20160149437 A | * | 12/2016 | E04H 6/42 |

*Primary Examiner* — Chuck Y Mah
(74) *Attorney, Agent, or Firm* — Perkins IP Law Group LLC; Jefferson Perkins (57) ABSTRACT

A wall protector molded from an elastomer has a front panel and ribs extending rearwardly from the front panel. Most of the rear edges of the ribs are forwardly displaced from a back plane of the body, thereby accommodating some rearward displacement of the front panel when impacted by a moving object such as a vehicle door. The wall protector may be removably affixed to a structure, such as a garage wall, by ball-and-socket fasteners.

18 Claims, 7 Drawing Sheets

(56) References Cited

U.S. PATENT DOCUMENTS

| | | | |
|---|---|---|---|
| 2015/0197926 A1* | 7/2015 | Jones | E03C 1/181 |
| | | | 4/658 |
| 2017/0231399 A1* | 8/2017 | Backus, III | A47C 19/02 |
| | | | 5/663 |
| 2020/0003527 A1* | 1/2020 | Azhagesan | F41H 5/013 |
| 2025/0042345 A1* | 2/2025 | Masanek, Jr. | B60R 13/01 |

* cited by examiner

WALL PROTECTOR

BACKGROUND OF THE INVENTION

Motorists prefer to park their vehicles inside of garages. Sometimes there is a relatively tight fit between the garage wall and e.g. the driver's door when this is swung out to an open position. If the driver is not paying attention, the driver might swing out the door with such force that the rear/outboard edge of the door will hit the garage wall or other nearby structure. When this happens, damage to the wall or other structure and to the edge of the door can result. A need therefore exists for apparatus to protect the garage wall from the edge of the car door, and vice versa.

SUMMARY OF THE INVENTION

According to one aspect of the invention, a wall protector is provided for mitigating an impact of a moving object, such as a vehicle door, on a structure, such as a garage or other wall. The protector has a body molded of an elastomer. A front panel of the body has a front surface, a rear surface, and a plurality of opposed edges. The body further has sidewalls each of which extend rearwardly from respective edges of the front panel. The rear edges of the sidewalls conform to a back plane that is rearwardly spaced from the rear surface of the front panel. The body further has a plurality of sockets that are spaced apart from each other. Each socket rearwardly extends from the rear surface of the front panel. Each socket has an inner sidewall. A socket restriction is disposed on the inner sidewall to be rearwardly spaced from the rear surface of the front panel. For each socket, a fastener is provided which includes a base and a ball extending forwardly from the base. The ball is received into the socket and in use is pressed forwardly beyond the socket restriction, so as to affix the ball to the socket. The base is then disposed in a plane that is approximately coplanar with the back plane. Means are provided to affix the base to the structure, such as an adhesive layer disposed on the rear surface of the base. The sidewalls of the body shroud the sockets from view, lending a neat appearance. The sockets and fasteners provide a method for releasably securing the protector to the structure.

In another aspect of the invention which is not alternative or exclusive to the first aspect of the invention, a protector is provided for mitigating an impact of a moving object, such as a vehicle door, on a structure. The protector has a body molded of an elastomer. A front panel of the body has a front surface, a rear surface opposed to the front surface and a plurality of opposed edges. The body has a plurality of sidewalls, each of which extend rearwardly from a respective edge of the front panel to a rear edge of the sidewall. The rear edges of the sidewalls conform to a back plane that is rearwardly spaced from the rear surface of the front panel. A plurality of ribs each extend rearwardly from the rear surface of the front panel to a rear edge of the rib. Most of the rear edges of the ribs are frontwardly spaced from the back plane. Means are provided to affix the protector to the structure, such that the front surface of the panel will be interposed between the structure and the moving object. Because of the spacing of most of the rear edges of the ribs from the back plane, the protector has more of an ability to rearwardly collapse, thereby absorbing more impact force.

In either of the above embodiments, the protector may be elongate in a horizontal direction. In that instance, the front surface of the front surface may be forwardly convex in a vertical direction. This shape means that for slight impacts, only a portion of the front surface of the front panel will make contact with the vehicle door or other object, and only a limited portion of the object, such as a door edge, will impact anything.

In those embodiments in which balls and sockets are used to fasten the protector to the structure, a plurality of spaced-apart, vertically arranged ribs may be provided, and at least one horizontally aligned rib may be provided. The sockets may be disposed at intersections of the horizontal rib and the vertical ribs. The sidewalls of the body shroud the balls and sockets from view, and the balls and sockets nonetheless provide an easy and convenient way to mount the protector to, and dismount the protector from, the structure.

In one or more of the above embodiments, the protector body may be injection-molded of a thermoplastic elastomer (TPE).

In one or more of the above embodiments, a sidewall is provided for each edge of the front panel. Rear edges of the sidewalls are continuous with each other.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
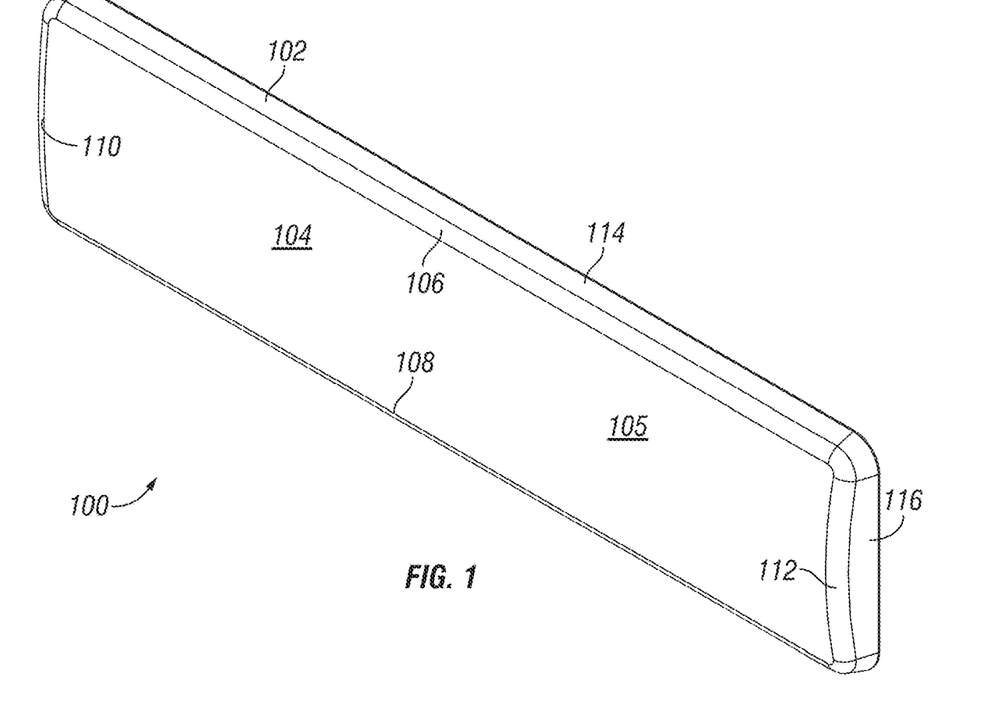
FIG. 1 is a front perspective view of a wall protector according to the invention.

One embodiment of a wall protector 100 according to the invention is shown in FIG. 1. The wall protector 100 has a body 102 with a front panel 104. The front panel 104 has a front surface 105 that in the illustrated embodiment is slightly forwardly convex in a vertical direction. The front panel 104 has a top edge 106, a bottom edge 108, a left edge 110 and a right edge 112. The top and bottom edges 106 and 108 may be horizontal and may be parallel to each other. Left and right edges 110 and 112 may be vertical and may be parallel to each other. In the illustrated embodiment, the front panel is substantially rectangular, but in other embodiments the body 102 could take other shapes. The body 102 may be horizontally elongate, as shown. This is so a vehicle may be parked next to protector 100 at any of various lengthwise horizontal positions relative to protector 100, and so that the front panel 104 will provide a large locus of places where a vehicle door edge may impact it. The horizontally elongate shape may also be useful where there is a variance in the lengthwise horizontal position of any other moving object likely to impact the structure, such as a ball, a trash can, a bicycle or long-handled tool.

Figure 2:
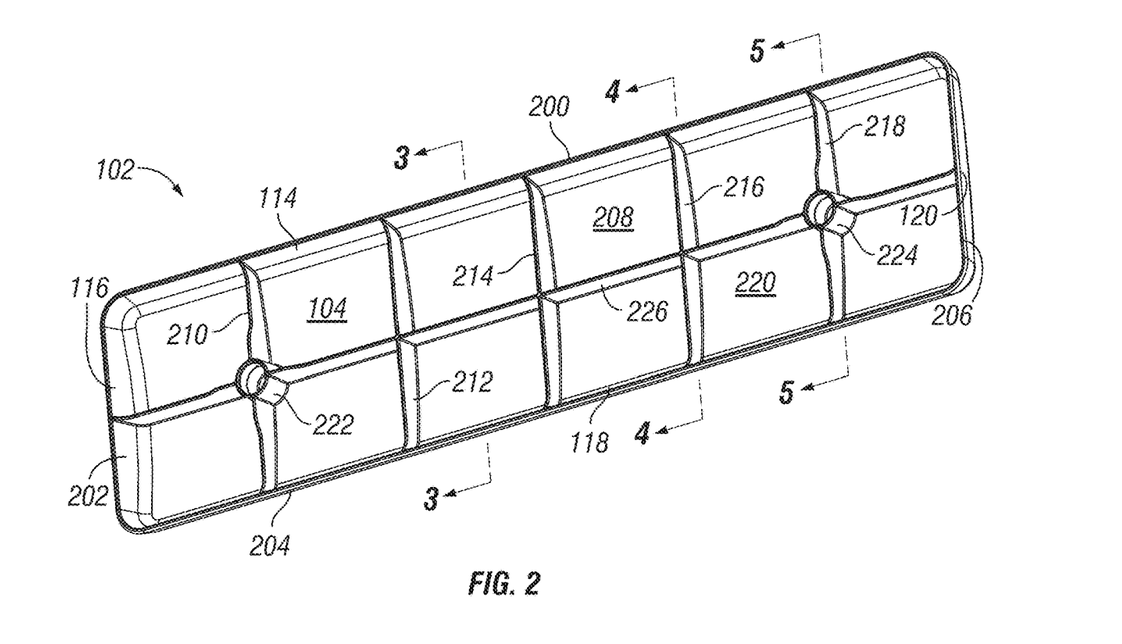
FIG. 2 is a rear perspective view of the wall protector shown in FIG. 1.

The body 102 has a plurality of sidewalls that extend rearwardly from the front panel 104. In the illustrated embodiments these include a top sidewall 114, a right sidewall 116, a bottom sidewall 118 opposed to top sidewall 114, and a left sidewall 120 opposed to right sidewall 116 (FIG. 2). For each sidewall, the transition between it and the front panel 104 may be forwardly convexly curved.

As seen in FIG. 2, the body 102 may be hollow. Top sidewall 114 rearwardly extends from its transition with front panel 104 to a top sidewall edge 200. Right sidewall 116 rearwardly extends from its transition with front panel 104 to a right sidewall edge 202. Bottom sidewall 118 rearwardly extends from its transition with front panel 104 to a bottom sidewall edge 204. And left sidewall 120 rearwardly extends from its transition with front panel 104 to a left sidewall edge 206. Most of the structures of body 102 are designed to a nominal thickness of about 0.125 in. given the TPE material used.

Figures 4, 5:
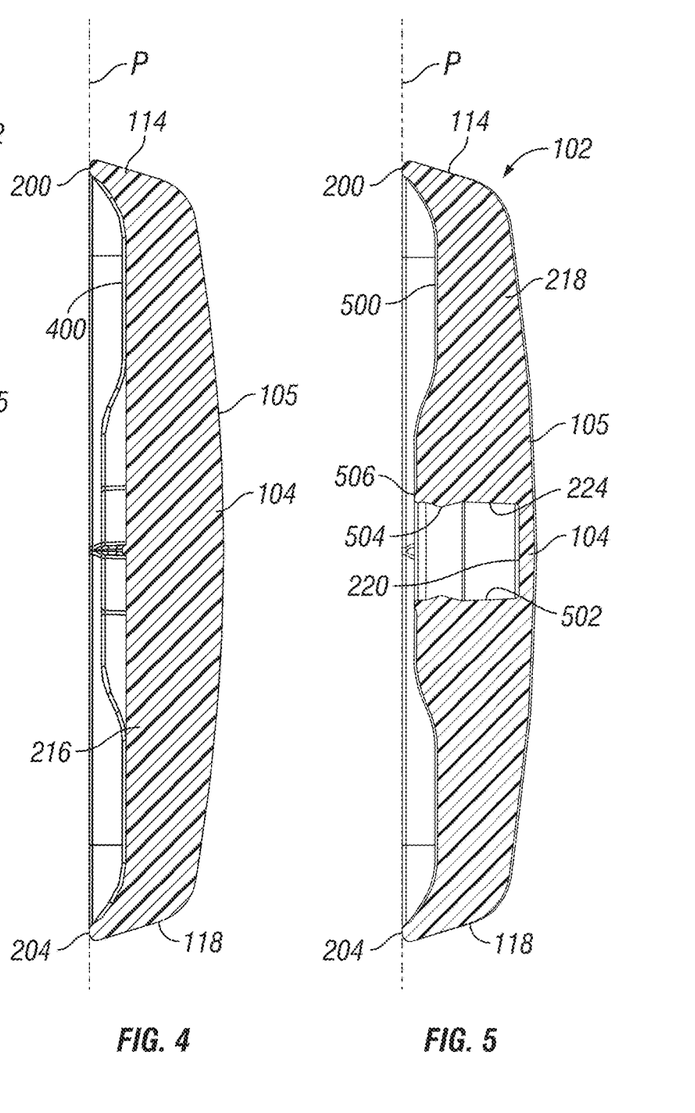
FIG. 4 is a vertical cross-sectional view taken substantially along Line 4-4 of FIG. 2.
FIG. 5 is a vertical cross-sectional view taken substantially along Line 5-5 of FIG. 2.
Figures 6, 7:
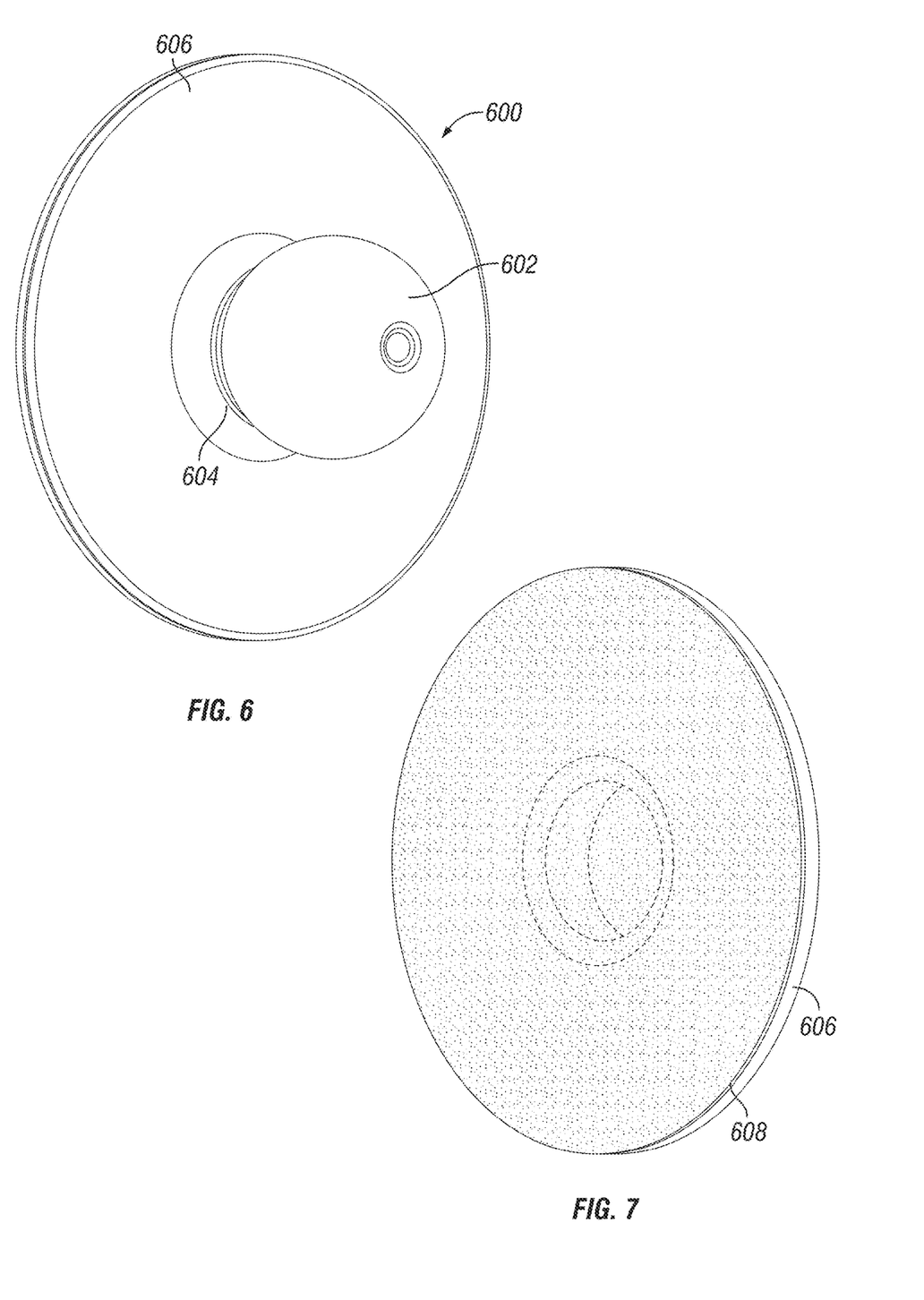
FIG. 6 is a front perspective view of a ball fastener used with one embodiment of the invention.
FIG. 7 is a front perspective view of the ball fastener shown in FIG. 6.

The sidewall rear edges 200, 202, 204 and 206 conform to a back plane P (FIGS. 5 and 6). When protector 100 is mounted to a structure to be protected, such as a wall, the front plane of the wall will be coplanar with back plane P. In this manner, the sidewalls 114-120 shroud or hide from view all components of the body 102 that are disposed in an interior 208 of the body 102.

The body 102 has a plurality of vertically disposed ribs, and in this embodiment there are five such ribs 210, 212, 214, 216 and 218. Each of the ribs 210-218 has a thickness in a horizontal direction that may be in the range of 0.06 to 0.13 in. Each of the body sidewalls 114-120 has an interior surface. The vertical ribs extend from the interior surface of top sidewall 114 to the interior surface of bottom sidewall 118. Ribs 210-218 may be disposed in parallel to each other and collectively occupy only a small part of the horizontal width of body 102. The spacing of ribs 210-218 from each other and from left and right sidewalls 120 and 116 may be regular, as shown. Each of the ribs 210-218 rearwardly extends from a rear surface 220 of the front panel 104.

The body 102 also has a plurality of sockets which rearwardly extend from the front panel rear surface 220. In the embodiment illustrated in FIG. 2, there are two such sockets 222 and 224. In other embodiments, particularly ones of increased horizontal width or height, there may be three or more such sockets, as is the case for the embodiment shown in FIGS. 11 and 12 (described below). In the illustrated embodiment, the sockets 222 and 224 are substantially cylindrical and have substantially cylindrical interior sidewalls, as described below. In other embodiments, the sockets 222, 224 and the "balls" inserted into them may be substantially prismatic rather than cylindrical, or the "balls" could be replaced with cylindrical bars and the sockets modified accordingly to receive them.

The body 102 further may have one or more horizontally disposed ribs. In this illustrated embodiment, there is provided one such horizontal rib 226 that horizontally extends from the interior surface of right sidewall 116 to the interior surface of left sidewall 120. Horizontal rib 226 may be disposed at right angles to vertical ribs 210-218 and may be disposed at a vertical center of body 102, as shown. The horizontal rib 226 intersects each of the vertical ribs 210-218.

In this illustrated embodiment, socket 222 is formed at the intersection of vertical rib 210 and horizontal rib 226, and socket 224 is formed at the intersection of vertical rib 218 and horizontal rib 226. Sockets 222 and 224 may be spaced well inward from sidewalls 114-120, and are spaced from each other, so as to lend the best support for the body 102 when mounted to a structure. In other embodiments, further sockets may be formed at other intersections of vertical and horizontal rib(s).

Figure 3:
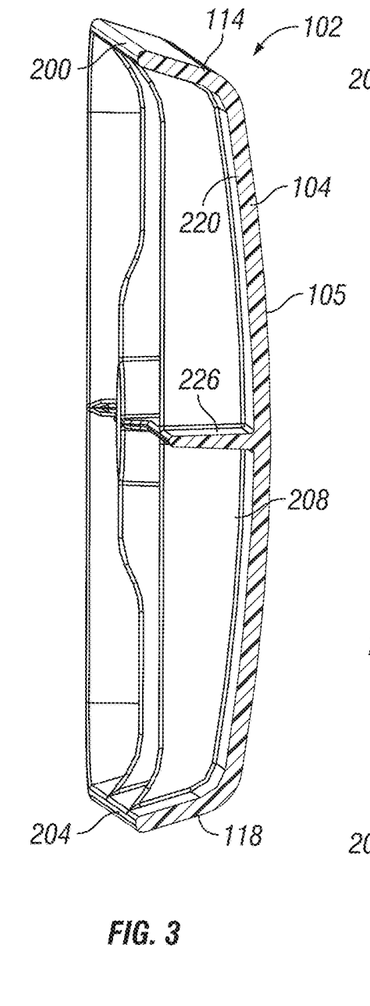
FIG. 3 is a vertical cross-sectional view taken substantially along Line 3-3 of FIG. 2.

The body 102 may be molded of a thermoplastic or thermosetting elastomer, and in the illustrated embodiment is injection-molded from a thermoplastic elastomer (TPE). Each of the front panel 104, the sidewalls 114-120 and the ribs 210-226 is yieldable and will elastically deform when subjected to a force from an impact. As shown in FIG. 3, interior 208 of body 102 is mostly air which will not resist any rearward collapse of front panel 104 or any of its supporting ribs.

A cross-section of rib 216 is shown in FIG. 4. Vertical ribs 212 and 214 have a similar shape. Each of these ribs 212-216 extends from front panel rear surface 220 rearwardly to a rear edge 400 thereof. Most of the rear rib edge 400 is spaced forwardly of back plane P; is it only in transitioning to top sidewall 114 or to bottom sidewall 118 that rear edge 400 begins to approach back plane P. This means that ribs 212-216 will be displaced rearwardly upon impact by a vehicle door to front panel front surface 105 by a certain distance, before having to deform. Because of this space, the resistance of each of ribs 212-216 and of body 102 in general will be smaller to an initial impacting displacement by a vehicle door, than to a subsequent impacting displacement in which the door edge impacts front panel with more range of motion and/or more force. This further mitigates any damage to the vehicle door.

A cross-section of rib 218 is shown in FIG. 5. As before, most of a rear edge 500 of rib 218 is forwardly displaced from back plane P. Edge 500 begins to approach back plane P as it nears socket 224 at the center, and as it nears top sidewall edge 200 or bottom sidewall edge 204. Still, there is a considerable air space between edge 500 and back plane P throughout most of rib 218's length, and as so spaced will not resist any initial rearward displacement caused by impact of a door edge on front surface 105. The structure of horizontal rib 226 is similar.

While the interior sidewall 502 of socket 224 is mostly cylindrical (or, in alternative embodiments, mostly prismatic), it is not completely so. A restriction 504 is disposed on sidewall 502 at some distance in from a rear edge 506 of the socket 224. The restriction 504 may be continuous and annular or may be otherwise. Since the sidewall of socket 224 is elastomeric, restriction 504 will stretch over the fastener ball (described below) and snap to the fastener ball's shaft when the fastener ball is pushed past restriction 504, acting to fasten the body 102 to the fastener. A depth of the socket 224 from the restriction 504 to the surface 220 should be chosen to be a little greater than a radius of the ball, so as to permit some overdrive when the body 102 is fastened to the ball fastener.

Rear surface 506 of socket 224 can be forwardly displaced from the back plane P. This is to provide room so that a rear surface of the base of the ball fastener (described below) will reside in, or slightly forwardly of, the back plane P. Such an arrangement will promote a seamless mating of the sidewall edges 200-206 with the garage wall or other structure to be protected, with no gaps.

A ball fastener 600 for use with the invention is shown in FIGS. 6 and 7. The ball fastener 600 has a substantially spherical ball 602 which forwardly terminates a shaft 604. The shaft 604 in turn forwardly extends from a base 606, which may take the form of a circular disk or any other convenient shape. Where sockets 222, 224 are prismatic instead of cylindrical, "ball" 602 would be many-sided instead of round. Base 606, shaft 604 and ball 602 may be integrally injection-molded of a thermoplastic that may be harder than the TPE forming body 102. Alternatively, base 606, shaft 604 and ball 602 could be formed of another material such as metal or wood.

A rear surface of base 606 has applied thereto a disklike adhesive layer 608 (FIG. 7), furnished to the consumer with a release layer on its rear surface.

Figure 8:
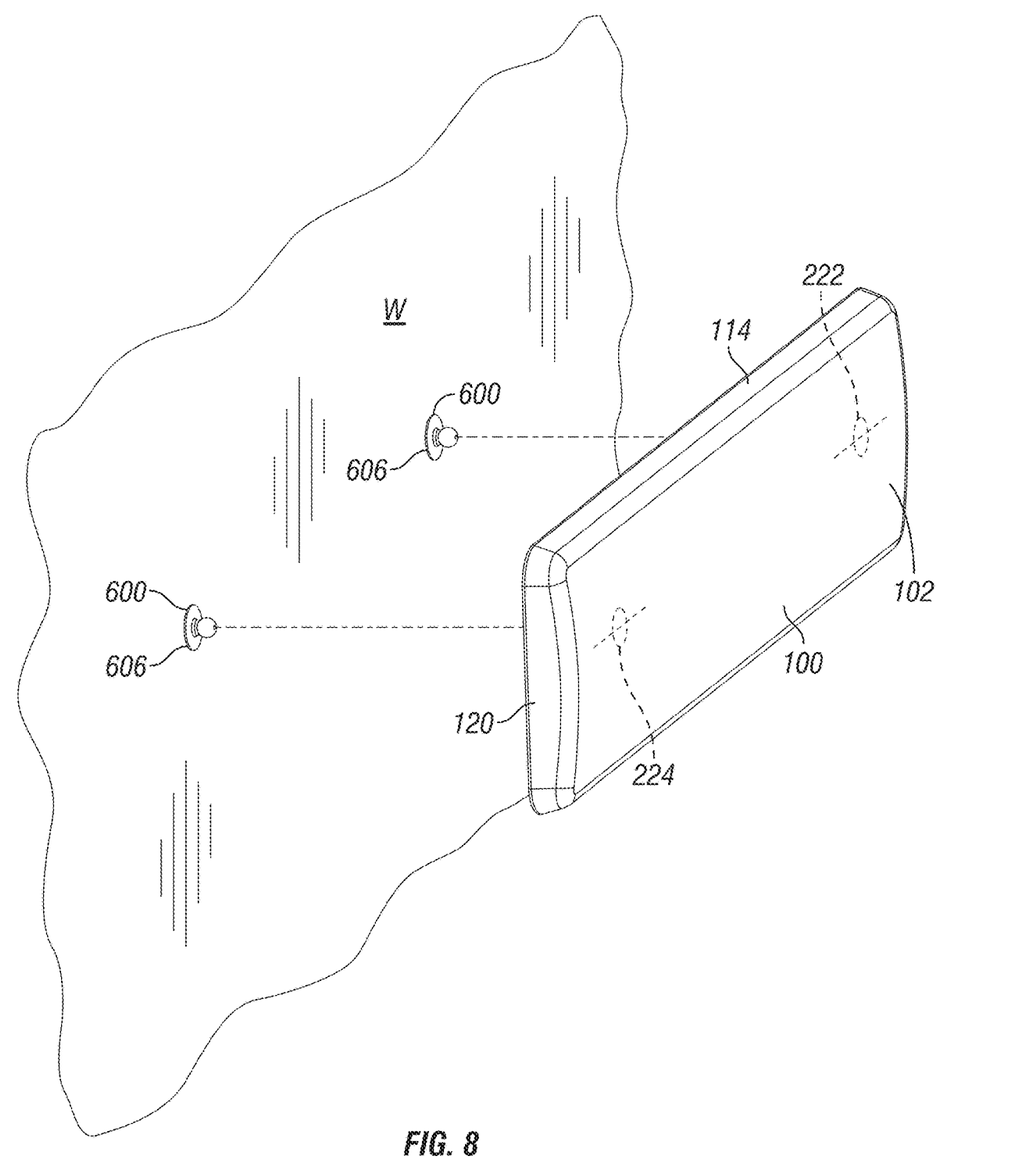
FIG. 8 is a schematic perspective view showing a step of installation of the wall protector on a garage wall.

The installation of protector 100 is shown in FIG. 8. First, ball fasteners 600 are snapped into sockets 222 and 224. The consumer peels off the release layer from the adhesive layer 608 on one of the fasteners 600, and presses the exposed adhesive layer to a garage wall W or other structure to be protected. Then, and using the adhered fastener 600 as an anchor and the body 102 as a self-template, the user locates where the second fastener 600 should be mounted, peels off the release layer from adhesive layer 608 thereof, and presses the body 102 and second fastener 600 against wall W.

As installed on wall W, the sidewalls 114-120 completely shroud or cover up the mounting hardware, lending a clean appearance to the installation. At need, the protector 100 can be easily pulled off of the ball fasteners 600.

After installation, the wall protector 100 will protect the wall W from the impact of a moving object, such as a vehicle door edge belonging to a vehicle parked nearby—and also will protect the vehicle door from the wall. The length of protector 100 in a horizontal direction permits the protector 100 to intercept an impacting object coming in from a range of lengthwise horizontal positions, such as a door edge from a vehicle parked in any of a range of nearby positions.

Figure 9:
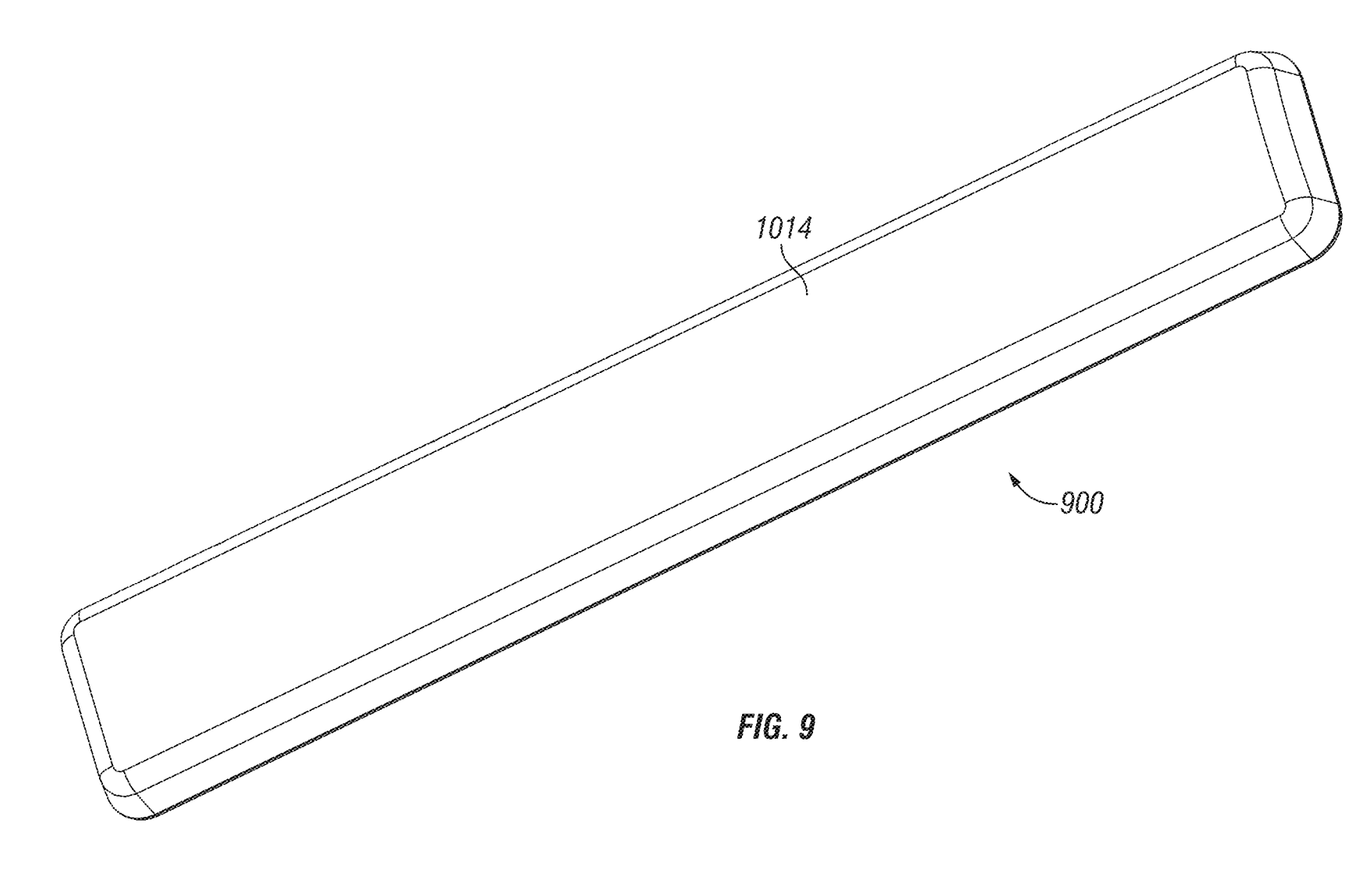
FIG. 9 is a front perspective view of a second embodiment of the invention.
Figure 10:
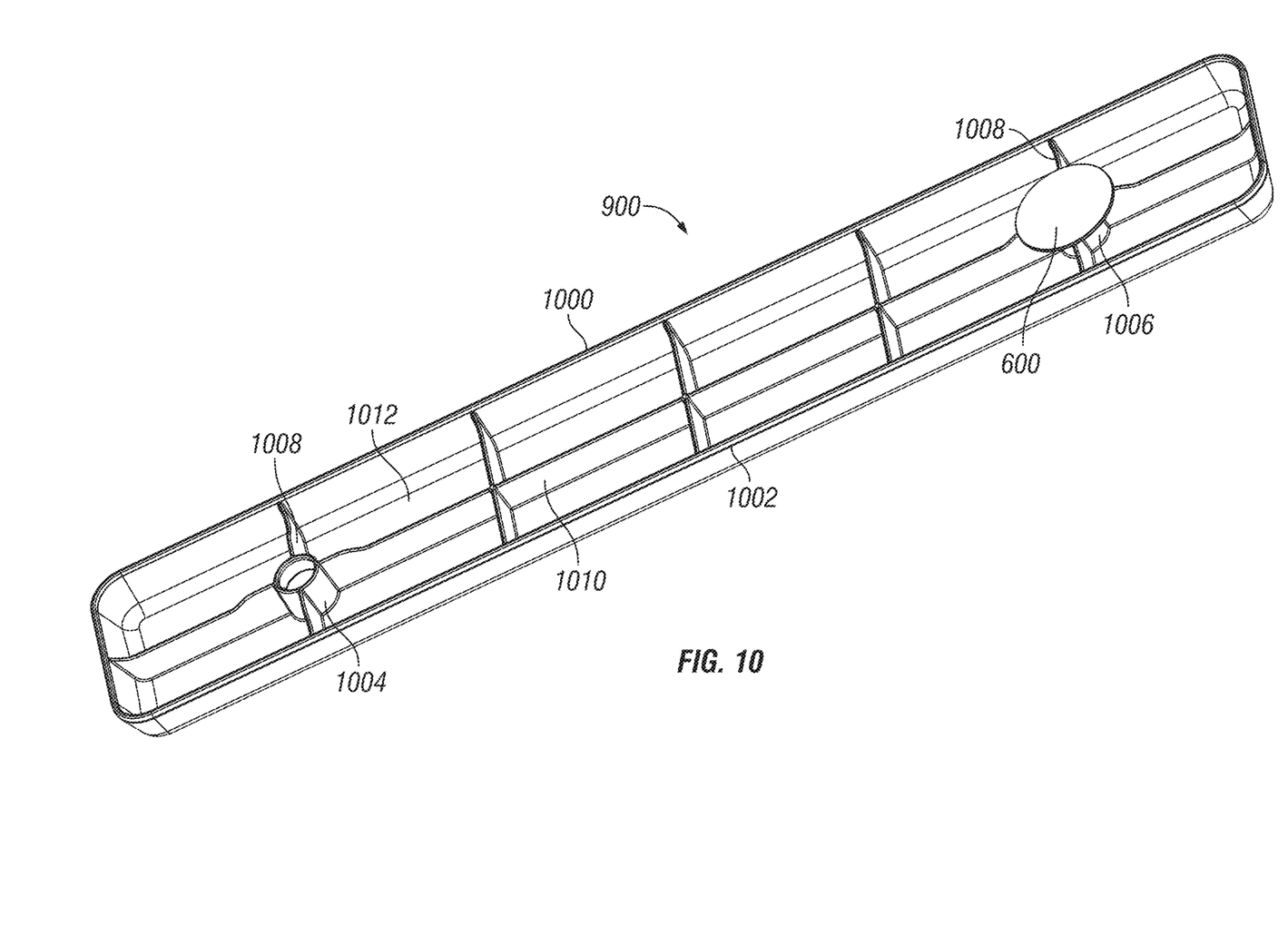
FIG. 10 is a rear perspective view of the embodiment shown in FIG. 9.

The embodiment of wall protector 100 illustrated in FIGS. 1 and 2 has a height, measured between the sidewall edges 200 and 204, of about six inches. It is possible to furnish wall protectors with heights different from this. One such embodiment is shown at 900 in FIGS. 9 and 10, in which a height of wall protector 900 between opposed top and bottom sidewall edges 1000 and 1002 is about four inches. Wall protector 900 has sockets 1004 and 1006 disposed at selected intersections of vertical ribs 1008 and horizontal rib 1010. Sockets 1004 and 1006 extend rearwardly from a rear surface 1012 of front panel 1014, as to each of ribs 1008 and 1010. For purposes of illustration, socket 1006 is shown with a ball fastener 600 snapped into it. In actual use, a ball fastener 600 would be received into each of sockets 1004 and 1006. Sockets 1004 and 1006 can be identical in form to sockets 222 and 224.

Figure 11:
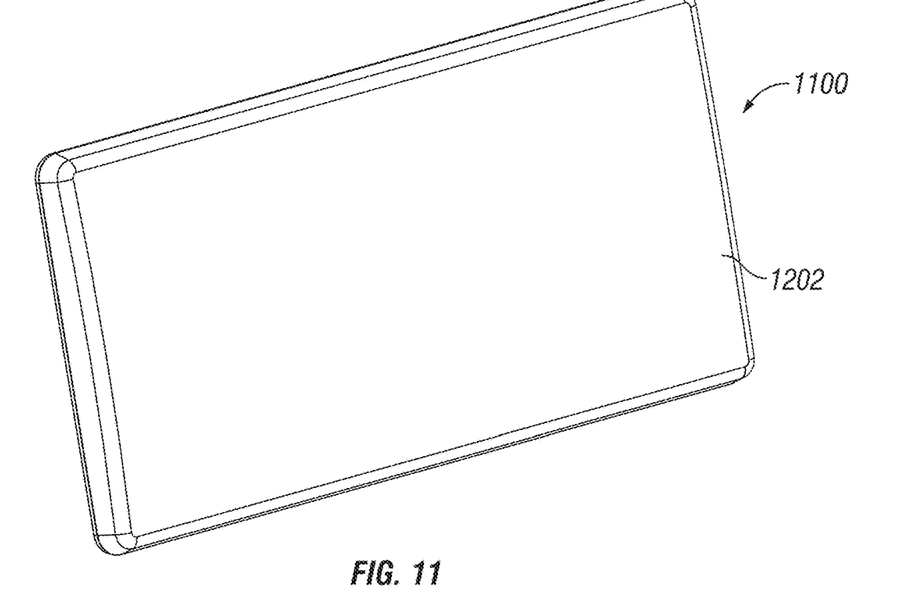
FIG. 11 is a front perspective view of a third embodiment of the invention.
Figure 12:
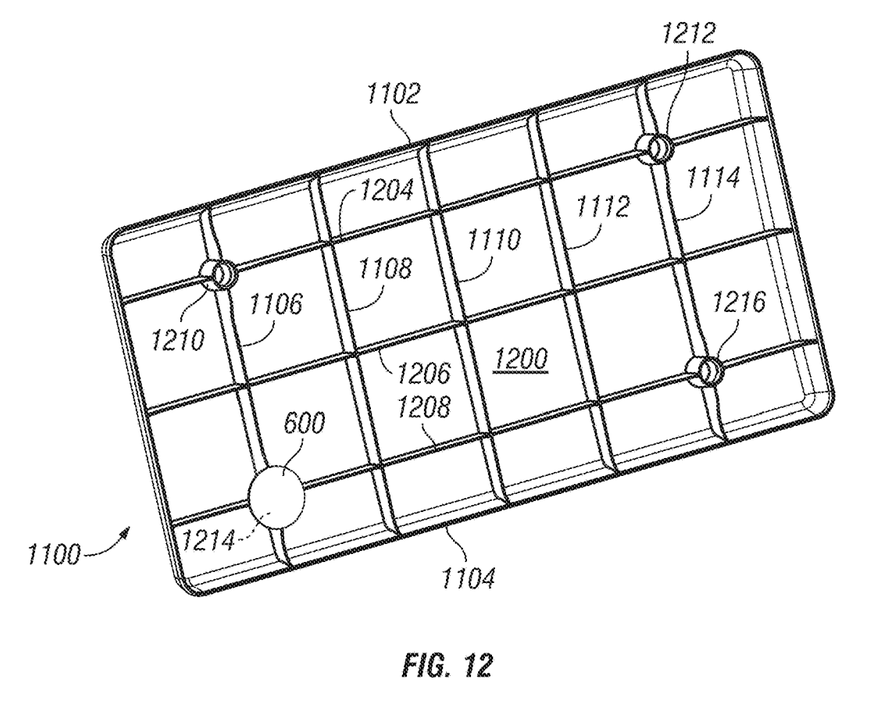
FIG. 12 is a rear perspective view of the embodiment shown in FIG. 11.

Another wall protector embodiment is shown generally at 1100 in FIGS. 11 and 12. Wall protector 1100 has a height, as measured between top sidewall edge 1102 and bottom sidewall edge 1104, of about twelve inches. As seen in FIG. 12, protector 1100 has five spaced-part parallel vertical ribs 1106, 1108, 1110, 1112 and 1114, each of which rearwardly extend from a rear surface 1200 of the protector front panel 1202. Also rearwardly extending from surface 1200 are three parallel spaced-apart horizontal ribs 1204, 1206 and 1208.

A socket 1210 is formed at the intersection of horizontal rib 1204 and vertical rib 1106. A socket 1212 is formed at the intersection of horizontal rib 1204 and vertical rib 1114. A socket 1214 is formed at the intersection of horizontal rib 1208 and vertical rib 1106. And a socket 1216 is formed at the intersection of horizontal rib 1208 and vertical rib 1114. Sockets 1210-1216 extend rearwardly from surface 1200 and may be similar to sockets 222 and 224.

A ball fastener 600 is, by way of illustration, shown snapped into socket 1214. In actual use, four such fasteners 600 would be received in respective sockets 1210, 1212, 1214 and 1216.

Apart from the difference in height, wall protectors 900 and 1100 function in much the same way as protector 100. They can be molded as a single piece from TPE. Most of their ribs will be forwardly spaced from a back plane to which the sidewall edges conform; the sidewalls shroud the internal structures from view. The protectors 900 and 1100 may be installed on a wall or other structure and be temporarily removed therefrom in the same way, leaving the mounting fasteners in place.

In summary, a wall protector has been shown and described which is molded of an elastomer. The body of the wall protector has a hollow interior with reinforcing ribs. Rear edges of the ribs are spaced forwardly of a back plane to which the edges of the body sidewalls conform, aiding in the elastic deformation of the protector body upon impact of its front panel by a door edge. Ball fasteners may be mounted on the structure to be protected, and these are snapped into sockets of the protector body in order to fasten the protector to the structure.

While embodiments of the present invention have been described above and illustrated in the appended drawings, the present invention is not limited thereto but only by the scope and spirit of the appended claims.

I claim:

1. A protector for mitigating an impact of a moving object on a structure, the protector comprising:
   a body molded of an elastomer, a front panel of the body having a front surface and a rear surface opposed to the front surface, the front panel having a plurality of opposed edges;
   a plurality of sidewalls of the body, each sidewall extending rearwardly from a respective edge of the front panel to a rear edge of the sidewall, the rear edges of the sidewalls conforming to a back plane that is rearwardly spaced from the rear surface of the front panel;
   a plurality of sockets, the sockets being spaced apart from each other, each socket rearwardly extending from the rear surface of the front panel to a socket rear end, the socket rear end being disposed forward of the back plane, the socket having an inner sidewall, a socket restriction disposed on the inner sidewall rearwardly of the rear surface of the front panel; and
   for each socket, a fastener including a base and a ball connected to and extending forwardly from the base, the ball received into the socket and in use pressed beyond the socket restriction to affix the ball to the socket, the base disposed in a plane that is approximately coplanar with the back plane.

2. The protector of claim 1, wherein the object is a vehicle door.

3. The protector of claim 1, wherein the structure is a wall.

4. The protector of claim 1, wherein the socket inner sidewall is substantially cylindrical apart from the socket restriction.

5. The protector of claim 1, wherein the ball is substantially spherical.

6. The protector of claim 1, wherein the base has a rear surface, an adhesive layer disposed on the rear surface of the base for affixing to the structure.

7. The protector of claim 1, wherein the body is elongate in a horizontal direction, the front surface of the front panel being forwardly convex in a vertical direction.

8. The protector of claim 1, wherein, for each edge of the front panel, a sidewall extends rearwardly from said edge to the back plane, the rear edges of the sidewalls being continuous with each other.

9. The protector of claim 1, wherein the body is integrally injection-molded of a thermoplastic elastomer.

10. A protector for mitigating an impact of a moving object on a structure, the protector comprising:
   a body molded of an elastomer, a front panel of the body having a front surface and a rear surface, the front panel having a plurality of opposed edges;
   a plurality of sidewalls of the body, each sidewall extending rearwardly from a respective edge of the front panel to a rear edge of the sidewall, the rear edges of the sidewalls conforming to a back plane that is rearwardly spaced from the rear surface of the front panel;
   a plurality of ribs of the body each rearwardly extending from the rear surface of the front panel to a rear edge of the rib, each rib extending from a sidewall to an opposed sidewall, most of the rear edge of the rib being frontwardly displaced from the back plane; and
   means for affixing the protector to the structure, such that the front surface of the front panel will be interposed between the structure and the moving object.

11. The protector of claim 10, wherein the moving object is a vehicle door.

12. The protector of claim 10, wherein the structure is a garage wall.

13. The protector of claim 10, wherein the body is elongate in a horizontal direction, ones of the ribs being spaced apart from each other and aligned to a vertical direction at right angles to the horizontal direction.

14. The protector of claim 10, wherein said ribs are vertical ribs, the body further including at least one horizontal rib extending rearwardly from the rear surface of the front panel, the at least one horizontal rib intersecting each of the vertical ribs, the at least one horizontal rib having a rear edge, most of the rear edge of the horizontal rib being forwardly displaced from the back plane.

15. The protector of claim 10, wherein the means for affixing the protector to the structure comprises a plurality of sockets rearwardly extending from the rear surface of the body so as to be laterally spaced from each other, for each socket, an interior sidewall of the socket having a socket restriction formed thereon to be disposed rearwardly of the rear surface of the front panel; and
   for each socket, a fastener having a ball adapted to be pressed into the socket beyond the socket restriction on the interior sidewall of the socket, means for affixing the fastener to the structure to thereby removably affix the protector to the structure.

16. The protector of claim 15, wherein the means for affixing the fastener to the structure comprises a base disposed rearwardly of the ball, the base having a rearward surface, an adhesive layer disposed on the rearward surface of the base for affixation to the structure.

17. The protector of claim 15, wherein the plurality of ribs include vertical ribs aligned to a vertical direction and at least one horizontal rib aligned to a horizontal direction at right angles to the vertical direction, the sockets disposed at intersections of the vertical ribs with the at least one horizontal rib.

18. The protector of claim 10, wherein the body is elongate in a horizontal direction, the front surface of the front panel being forwardly convex in a vertical direction at right angles to the horizontal direction.

* * * * *